(12) United States Patent
Hirschi et al.

(10) Patent No.: US 11,955,804 B2
(45) Date of Patent: Apr. 9, 2024

(54) LOAD TRANSFERRING ELEMENT AND HOUSING OF A STATIONARY PART OF A WPT SYSTEM COMPRISING A LOAD TRANSFERRING ELEMENT

(71) Applicant: TDK Electronics AG, Munich (DE)

(72) Inventors: Pascal Hirschi, Munich (DE); Abiezer Tejeda, Munich (DE); Thomas Lohmann, Munich (DE)

(73) Assignee: TDK Electronics AG, Munich (DE)

( * ) Notice: Subject to any disclaimer, the term of this patent is extended or adjusted under 35 U.S.C. 154(b) by 0 days.

(21) Appl. No.: 17/428,064

(22) PCT Filed: Apr. 14, 2020

(86) PCT No.: PCT/EP2020/060443
§ 371 (c)(1),
(2) Date: Aug. 3, 2021

(87) PCT Pub. No.: WO2020/212335
PCT Pub. Date: Oct. 22, 2020

(65) Prior Publication Data
US 2022/0069622 A1  Mar. 3, 2022

(30) Foreign Application Priority Data
Apr. 18, 2019  (DE) .......................... 102019110361.4

(51) Int. Cl.
*H02J 50/00* (2016.01)
*B60L 53/12* (2019.01)
*H01F 27/02* (2006.01)
*H01F 38/14* (2006.01)

(52) U.S. Cl.
CPC ............ *H02J 50/005* (2020.01); *B60L 53/12* (2019.02); *H01F 27/02* (2013.01); *H01F 38/14* (2013.01)

(58) Field of Classification Search
CPC ........ H02J 50/005; H02J 7/0042–0044; B60L 53/12–126; B60L 53/30; B60L 53/31; B60L 53/38–39; H01F 27/02–04; H01F 27/06; H01F 27/24–266; H01F 27/40–402; H01F 2027/065; H01F 2027/404–408; H01F 38/14
See application file for complete search history.

(56) References Cited

U.S. PATENT DOCUMENTS 5,257,668 A * 11/1993 Sargent ................ G01G 3/1402
177/50
9,543,065 B2   1/2017 Kurihara et al.
10,290,420 B2   5/2019 Berg et al.
(Continued)

FOREIGN PATENT DOCUMENTS

CN         107275044 A   10/2017
DE      112014003140 T5    4/2016
(Continued)

*Primary Examiner* — Rexford N Barnie
*Assistant Examiner* — David A Shiao
(74) *Attorney, Agent, or Firm* — Slater Matsil, LLP (57) ABSTRACT

In an embodiment a load transfer element includes a bottom side, a top side and a connection between the bottom side and the top side, wherein the load transfer element is configured to transfer a mechanical load from a top side of a housing of a stationary part of a wireless power transfer (WPT) system to a bottom side of the housing.

19 Claims, 5 Drawing Sheets

(56) References Cited

U.S. PATENT DOCUMENTS

| | | | |
|---|---|---|---|
| 10,369,892 B2* | 8/2019 | Cordes | B60L 53/12 |
| 10,374,467 B2 | 8/2019 | Murashige et al. | |
| 2010/0331998 A1* | 12/2010 | Ringeisen | A61L 27/52 |
| | | | 623/23.61 |
| 2011/0181240 A1* | 7/2011 | Baarman | H02J 7/00 |
| | | | 320/108 |
| 2013/0181667 A1* | 7/2013 | Takeshita | H01F 38/14 |
| | | | 320/108 |
| 2013/0249304 A1* | 9/2013 | Keeling | B60L 53/126 |
| | | | 307/104 |
| 2014/0055089 A1* | 2/2014 | Ichikawa | B60L 53/38 |
| | | | 320/108 |
| 2014/0361635 A1* | 12/2014 | Ookawa | H01F 38/14 |
| | | | 307/104 |
| 2015/0061582 A1 | 3/2015 | Tatsuta et al. | |
| 2015/0332826 A1* | 11/2015 | Kurihara | H01F 27/29 |
| | | | 307/104 |
| 2015/0367739 A1* | 12/2015 | Böser | H01F 27/36 |
| | | | 320/108 |
| 2016/0143194 A1 | 5/2016 | Yanagida | |
| 2016/0172105 A1* | 6/2016 | Berg | H01F 27/02 |
| | | | 320/108 |
| 2016/0260538 A1* | 9/2016 | Tanaka | H01F 27/2895 |
| 2017/0033606 A1* | 2/2017 | Maikawa | H02J 50/70 |
| 2017/0288465 A1* | 10/2017 | Sugasawa | H01F 27/36 |
| 2017/0288469 A1* | 10/2017 | Murashige | H02J 50/70 |
| 2018/0236881 A1* | 8/2018 | Grienitz | B60L 53/12 |
| 2019/0006826 A1* | 1/2019 | Islinger | B60L 53/38 |
| 2019/0225098 A1* | 7/2019 | Helm | B60K 1/04 |
| 2020/0139828 A1* | 5/2020 | Laemmle | H02J 50/005 |
| 2020/0276906 A1* | 9/2020 | Wechsler | B60L 53/124 |

FOREIGN PATENT DOCUMENTS

| | | |
|---|---|---|
| DE | 102015200847 A1 | 6/2016 |
| DE | 102017106917 A1 | 10/2017 |
| EP | 2620960 A1 | 7/2013 |
| EP | 3468320 A2 | 4/2019 |
| GB | 2566014 A | 3/2019 |
| JP | 201289618 A | 5/2012 |
| JP | 2016213972 A | 12/2016 |
| WO | 2008140333 A2 | 11/2008 |

* cited by examiner

Fig. 14

LOAD TRANSFERRING ELEMENT AND HOUSING OF A STATIONARY PART OF A WPT SYSTEM COMPRISING A LOAD TRANSFERRING ELEMENT

This patent application is a national phase filing under section 371 of PCT/EP2020/060443, filed Apr. 14, 2020, which claims the priority of German patent application 102019110361.4, filed Apr. 18, 2019, each of which is incorporated herein by reference in its entirety.

TECHNICAL FIELD

The present invention refers to elements increasing the structural stability of parts of a WPT system.

BACKGROUND

In WPT systems (WPT=wireless power transfer) power can be transferred from a primary part of the system to a secondary part of the system. Usually, the primary part is a stationary part and the secondary part is a mobile part. Both parts can have one or more coils. A coil in the primary part can be a transmission coil and a coil in the mobile part can be a reception coil. At operating frequencies around 85 kHz magnetic power is emitted by the transmission coil and can be received by the reception coil. The power can be in the range of a few Watt, e.g. for powering a power source of a mobile communication device. However, the power range can go up to several kW, e.g. to power an electric vehicle.

Typically, the stationary part of a WPT system is installed at a fixed position. The mobile part of the WPT system will be moved into a position on or above the stationary part such that power transfer can take place with a sufficiently high degree of efficiency.

When WPT systems for electric vehicles are concerned then, in order to position the electric vehicle with its secondary part above the primary part, a wheel carrying at least partially the weight of the vehicle may exert a substantial vertical force onto the stationary part of the WPT system. The WPT system typically comprises several additional elements, e.g. sensors, switches, electric or electronic circuitry, that could be harmed when a heavy vehicle drives onto the stationary part.

SUMMARY

Embodiments provide an increased structural stability of a stationary part of a WPT system and a correspondingly enhanced stationary part of the WPT system. Further embodiments provide that the structural enhancement is compatible with strong magnetic fields but should not interfere with the work of sensors and circuitry contained in the system.

The load transferring element comprises a bottom side, a top side and a connection between the bottom side and the top side. The element is provided and adapted to transfer a mechanical load from a top side of the housing of a stationary part of a WPT system to a bottom side of the housing.

It is preferred that the load transferring element is compatible with the presence of strong magnetic fields and with the spatial requirements within the housing concerning magnetic field guiding structures such as ferrite sheets and the like.

Further, it is preferred that the load transferring element is compatible with a sensor or with a plurality of sensors. A WPT system may need sensors to detect the presence of one or more foreign objects that would prevent the stationary part from emitting magnetic power. Further, the stationary part of a WPT system comprises active and passive circuitry that need protection against vertical forces but that must not be disturbed during their operation.

Further, it is preferred that the load transferring element can be provided in a cost efficient manner, that the load transferring element has small spatial dimensions to allow compact stationary parts of the WPT system and that the load transferring element does not excessively contribute to the stationary part's weight in order to simplify an installation of the part.

It is possible that the load transferring element has a cross-section at the bottom side, a cross-section at the top side and a cross-section at a vertical position between the bottom side and the top side in the connection between the bottom side and the top side. A cross-section of the connection can be smaller than a cross-section at the bottom side and/or at the top side.

Such a configuration allows to cover a substantially large area at the bottom side of the stationary part and a substantial part of the top part of the stationary part where the part is protected against strong vertical forces. In addition, a smaller cross-section at a vertical position in between the bottom side and the top side allows more space in the housing of the WPT system that can be used for accommodating other essential parts such as coils, circuitry, sensors, switches and the like.

Specifically, it is possible that the load transferring element is a pillar or a pillar-shaped structural enhancement.

Then, the load transferring element transmits the weight of the structure above to the structural elements below. When a compression of the corresponding material between the bottom side and the top side is necessary, then the compression takes place at the side of the load transferring element without compressing the other essential or additional elements of the stationary part of the WPT system.

When the load transferring element has a pillar shape or a pillar-like shape, then the load transferring element can have a round or an elliptic cross-section. Additionally, it is possible that the cross-section is a quadratic or rectangular cross-section with or without chamfered or rounded edges extending along a vertical direction.

It is possible that the load transferring element has a vertical position where the cross-section reaches a minimal value. From the bottom side to the position of minimal cross-section, the cross-section can be decreasing. From the vertical position of the minimal cross-section to the top side of the load transferring element the cross-section can be increasing.

It is possible that the load transferring element consists of a single part. As an alternative, it is possible that the load transferring element consists of a bottom part and a top part. Also, it is possible that the load transferring element consists of a plurality of three or more parts.

The parts of the load transferring elements can be arranged in an essentially stacked configuration. One or several parts of the load transferring elements can have one or more recesses and/or one or more elevations that correspond to a specific recess of the part above or below with a specific geometry such that a horizontal sliding movement is prohibited by the corresponding interlocking between an elevation and a recess.

Specifically, it is possible that the load transferring element comprises a bottom part and a top part that are mechanically connected in a pin/well configuration or in a pin/tube configuration.

In a pin/well configuration one part of the load transferring element has a pin directed in a vertical direction (up or down). The corresponding adjacently arranged part of the load transferring element has a well shaped at the corresponding position. An interlocking can be obtained by arranging the pin of the one part in the well of the respective other part.

Depending on the depth of the well the configuration establishes a pin/tube configuration.

It is possible that the load transferring element comprises or consists of a material having a suitable magnetic susceptibility $\chi$.

A correspondingly chosen magnetic susceptibility prevents the load transferring element from interfering with the magnetic power transfer between the parts of the WPT system. Further, a corresponding magnetic susceptibility makes the material magnetically inactive and prevents or reduces energy dissipation in the housing of the WPT system to maintain a high power transfer efficiency.

Similarly, the magnetic susceptibility as described above allows corresponding sensors, e.g. of an FOD system (FOD=foreign object detection) to securely protect the environment of the WPT system.

It is possible that the load transferring element comprises or consists of a material selected from a polyamide, polyamide 66, a composite material, fiberglass, CFRP (carbon fiber reinforced polymer) and a thermoplastic Polyamide 66 is made of two monomers, each containing six carbon atoms, hexamethylene diamine and adipic acid.

These materials are compatible with the requirements of magnetic inactivity, low density and high structural stability.

It is possible that the load transferring element has one or more cut-outs provided and adapted to host at least partially a sensor and/or a coil.

It is possible that the load transferring element is also used to maintain desired positions of essential elements of the WPT system, e.g. of the primary coil or of sensors. The load transferring element has a high structural stability and thus can ensure maintenance of a precise position of the corresponding elements that is necessary in order to fulfil the circuit components' function. The cut-out can be a cut-out in a horizontal direction or in a vertical direction. When the cut-out is in a horizontal direction, e.g. at a vertical position between the bottom side and the top side, then the cut-out can support at least a part of the primary coil.

When the cut-out is a vertical cut-out, e.g. at the bottom side of the load transferring element or at the top side of the load transferring element, then the corresponding cut-out can be used to accommodate one or more sensors, switches, active circuitry or passive circuitry at least partially.

Especially a cut-out at the top side of the load transferring element is arranged in the vicinity or at the top side of the housing where sensors, e.g. of an FOD system can be arranged in preferred configurations.

It is possible that the load transferring element is provided and adapted to transfer a load of 30 kN.

The area of a wheel of an electric vehicle that touches the ground below the vehicle can be relatively small, especially when narrow wheels providing a reduced drag of the vehicle are preferred. Thus, a high pressure can be locally exerted onto the stationary part of the WPT system when a wheel of the vehicle drives over the stationary part. Although the stationary part comprises a plurality of load transferring elements, the whole load can be concentrated at one position. A corresponding load transferring element arranged at this position must then carry the complete load essentially by itself.

A load of 30 kN essentially corresponds to a mass of approximately 3 tons exerting a gravitational force onto the stationary part of the WPT system.

Thus, when each of the load transferring elements can handle such forces, then the elements of the stationary part are well protected.

It is possible that the load transferring element has a length l, a width w and a height h. The length can be larger than or equal to 5 cm and smaller than or equal to 30 cm. The width can be larger than or equal to 5 cm and smaller than or equal to 30 cm. The height can be larger than or equal to 5 cm and smaller than or equal to 15 cm.

In this context, the terms "length" and "widths" refer to extensions in horizontal directions. The term "height" refers to an extension in the vertical direction.

As described above, it is possible that a housing of a stationary part of a WPT system comprises one or a plurality of load transferring elements as described above. Further, the housing can have a bottom side and a top side and a primary coil.

Then, the load transferring element can be used to transfer a load from the top side of the housing to the bottom side of the housing and, correspondingly, protect a primary coil from strong vertical forces.

It is possible that the housing comprises one or a plurality of sensors.

The sensors can be used in a FOD system to protect the environment of the WPT system. The sensors can be attached to or integrated in cut-outs of one or several load transferring elements that provide a protected accommodation.

Specifically, it is possible that one or a plurality of sensors are arranged at the top side of the stationary part and/or at sidewalls of the stationary part to monitor the stationary part's environment.

Additionally, the housing can comprise active and/or passive circuitry e.g. to drive the primary coil, to maintain a resonance frequency of the primary coil and to drive the FOD system.

It is possible that the housing comprises one or a plurality of magnetic field guiding structures.

The magnetic field guiding structures can comprise sheets of a magnetic material, e.g. of a ferrite material to guide the magnetic field to the position of the secondary coil in a mobile part of the WPT system.

It is possible that the housing comprises a structured top side. The top side of the housing establishes the perimeter of the housing at a vertical top side. The structured top side provides the area on which a wheel of an electric vehicle can drive. A structured top side increases friction and reduces the probability of the wheel slipping at the top side of the housing.

It is possible that the housing comprises or consists of a plastic material that is compatible with the magnetic requirements of a WPT system.

BRIEF DESCRIPTION OF THE DRAWINGS

Central aspects of the load transferring element and of a corresponding housing of a stationary part of a WPT system, working principles and details of preferred embodiments are shown in the schematic accompanying figures.

DETAILED DESCRIPTION OF ILLUSTRATIVE EMBODIMENTS

Figure 1:
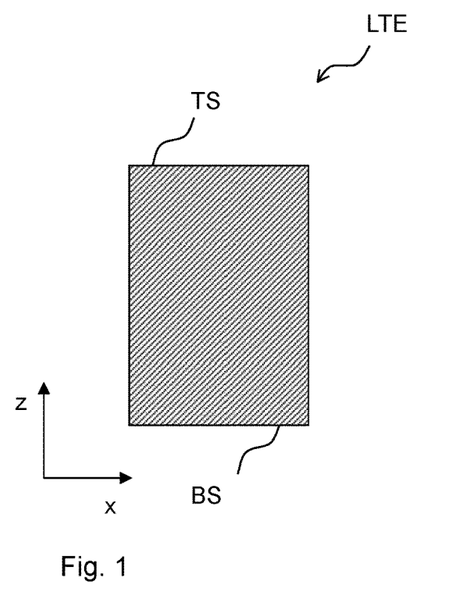
FIG. 1 shows a cross-section through a load transferring element.

FIG. 1 illustrates a cross-section through a load transferring element LTE. The load transferring element LTE has a bottom side BS and a top side TS. The bottom side BS is arranged at a low vertical position set. The top side TS is arranged at a higher vertical position set. The load transferring element is provided and adapted to transfer a mechanical load from its top side T, which can be arranged at the top side of the housing of a stationary part of a WPT system, to a bottom side BS of the load transferring element LTE which can be arranged at the bottom side of the housing.

The housing can have a base plate being essentially arranged parallel to the xy plane and the vertical direction z is orthogonal to the xy plane.

The load transferring element LTE has stiffness parameters, specifically stiffness parameters in the vertical direction, that allow accommodation of sensitive circuit elements in the housing of the WPT system without compression because the load transferring element absorbs the vertical forces and/or compressions if necessary.

Thus, the structural integrity of WPT systems is substantially increased while small spatial dimensions in the high package density are possible.

Figure 2:
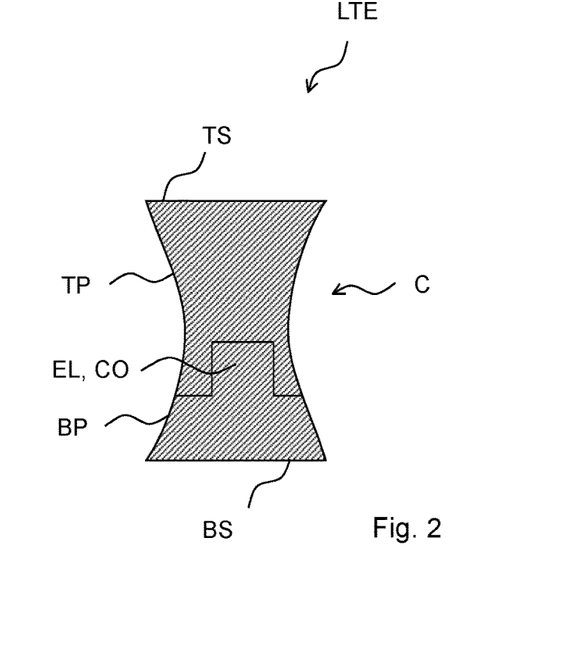
FIG. 2 shows a cross-section through a load transferring element with a varying cross-section.

FIG. 2 illustrates the possibility of dividing the load transferring element LTE into a bottom part BP and a top part TP. A connection area between the bottom part BP and the top part TP is arranged somewhere near the connection C between the bottom side BS and the top side TS. The bottom part BP and the top part TP can be configured as pin/well elements. The load transferring element LTE shown in FIG. 2 has an elevation at the top side of the bottom part BP. The bottom side of the top part TP has a cut-out CO. A stable connection that can transfer a strong force from the top side TS to the bottom side BS is obtained by a configuration where the elevation EL is arranged in the cut-out CO of the top part TP. A pin/well connection can be obtained whether the parts of the load transferring elements LTE have a rotational symmetry or not.

Figure 3:
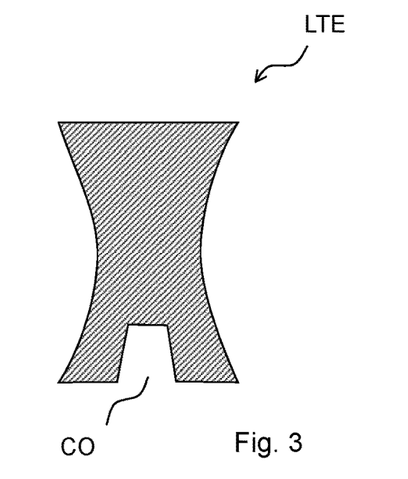
FIG. 3 shows a cross-section through a load transferring element having a cut-out at its bottom side.

FIG. 3 shows the possibility of having a cut-out CO at the bottom side of the load transferring element LTE. Then a pin/well connection between the load transferring element LTE and a bottom part of the housing is improved.

Figure 4:
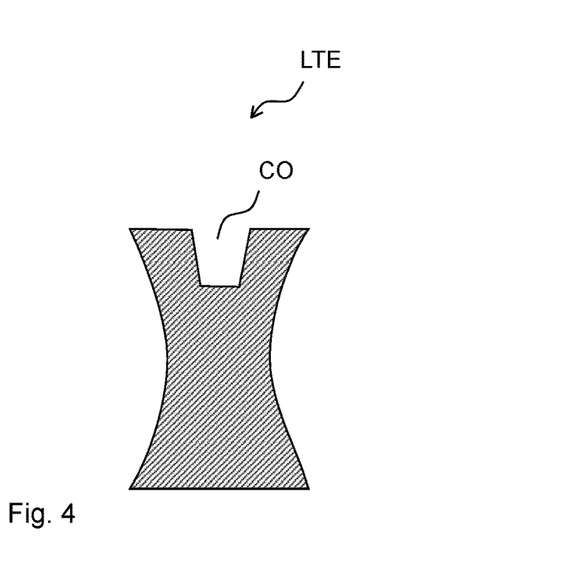
FIG. 4 shows a cross-section through a load transferring element having a cut-out at its top side.

FIG. 4 illustrates the possibility of having a cut-out CO at the top side of the load transferring element LTE to enhance a connection between the load transferring element LTE and a top part of the housing.

Figures 5, 6:
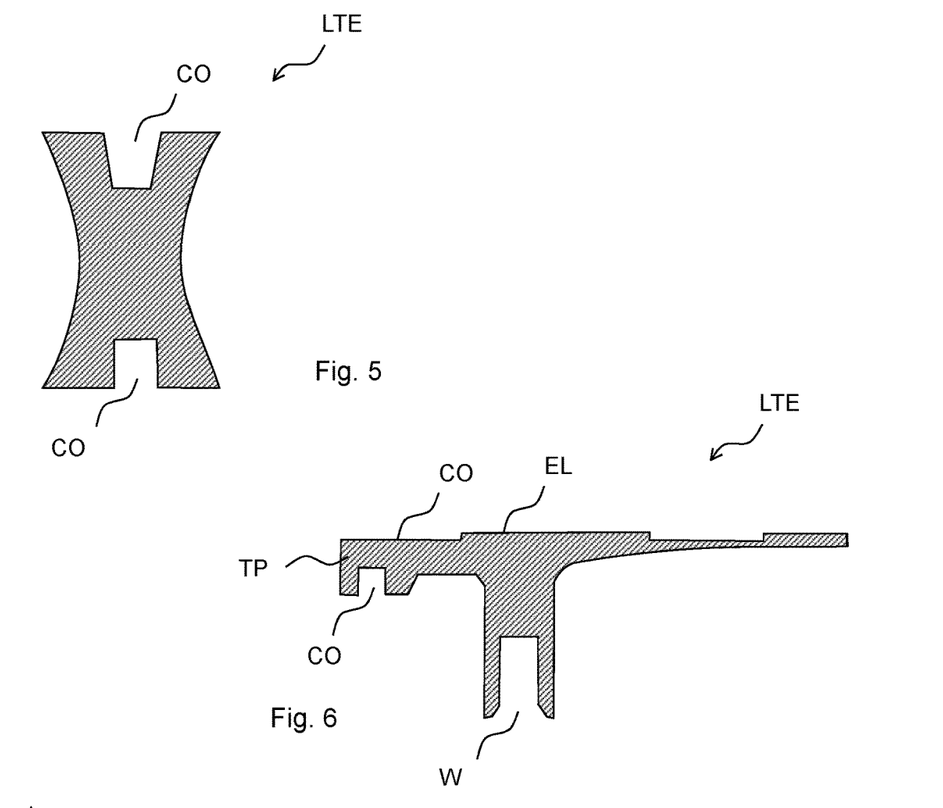
FIG. 5 shows a cross-section through a load transferring element having a cut-out at the bottom side and a cut-out at the top side.
FIG. 6 shows a cross-section through a load transferring element being optimized for a reduced space consumption in the housing.

FIG. 5 shows the possibility of having a cut-out CO at the bottom side and at the top side of the load transferring element LTE to improve the stability and the fitting of the load transferring element LTE between a bottom part and a top part of the housing.

FIG. 6 illustrates a cross-section through a load transferring element LTE that is optimized for a reduced space consumption in a housing. At the bottom side of the load transferring element LTE a cut-out is arranged to establish the well of a pin/well connection. At the top side an elevation EL and a cut-out CO are arranged to enhance the connection of the load transferring element LTE to a top part of the housing. An additional cut-out CO is arranged at a bottom side of the top part TP of the load transferring element LTE. In this cut-out a part of a sensor or a pin for establishing an improved connection can be arranged.

Figure 7:
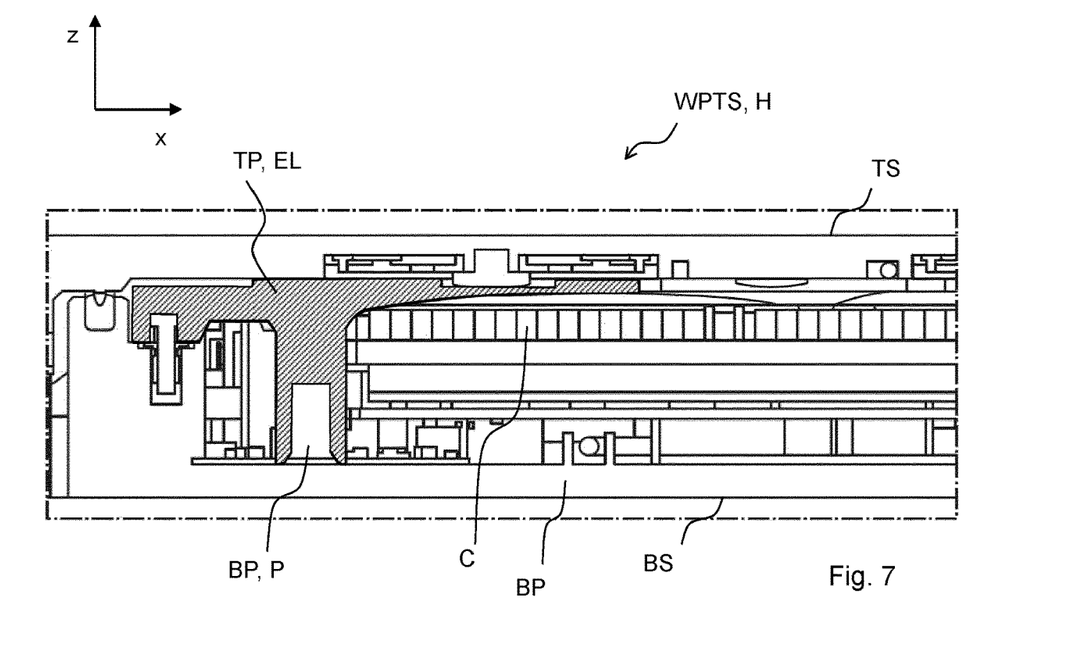
FIG. 7 illustrates an arrangement of the load transferring element of FIG. 6 in a corresponding housing.

FIG. 7 shows a segment of a housing H of a stationary part of a WPT system WPTS in a cross-sectional view. Specifically, FIG. 7 shows a possible integration of the load transferring element LTE shown in FIG. 6 such that a high structural stability is obtained while a minimized space for the load transferring element LTE is consumed.

A bottom part BP has a bottom side BS of the housing H. The bottom part BP has a pin P arranged in the well W shown in FIG. 6 to provide a good and stable integration of the load transferring element LTE in the housing H. The load transferring element LTE protects a coil C from vertical forces exerted onto the top side TS of the housing.

Other elements such as active or passive circuit elements and sensors are also integrated in the housing H that can be provided with a small volume despite the high number of integrated elements and functionalities.

Figure 8:
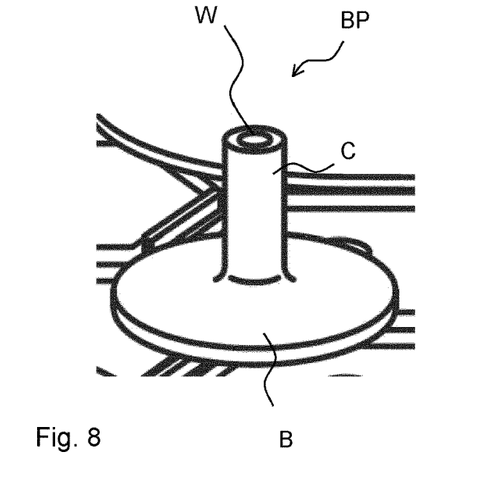
FIG. 8 shows a bottom part of a load transferring element having a rotational symmetry in a perspective view.

FIG. 8 illustrates a bottom part BP of a load transferring element showing a base B and a connection C. The connection C has a cut-out in the form of a well W at its top side. The bottom part BP of the load transferring element shown in FIG. 8 has a rotational symmetry with a rotational axis in the vertical direction set.

Figure 9:
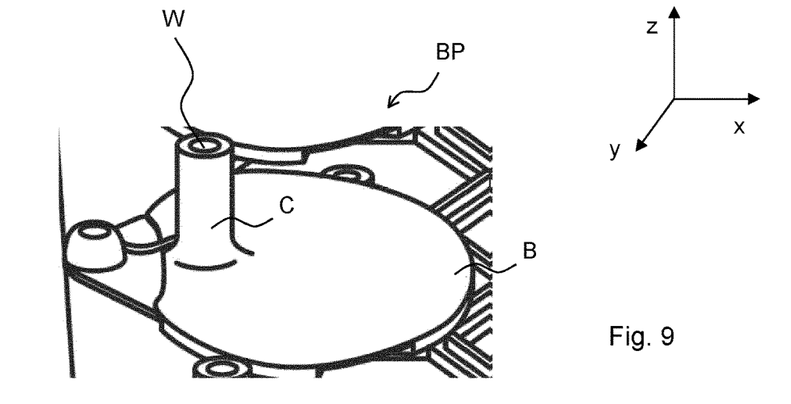
FIG. 9 shows an asymmetric bottom part of a load transferring element.

In contrast, FIG. 9 illustrates a bottom part BP of a load transferring element where the connection C has a rotational symmetry but where the base B has no rotational symmetry. Specifically, the connection C is arranged at a perimeter of the base B such that the larger area over the base B can be used to accommodate circuit elements of the WPT system, e.g. a coil.

Figure 10:
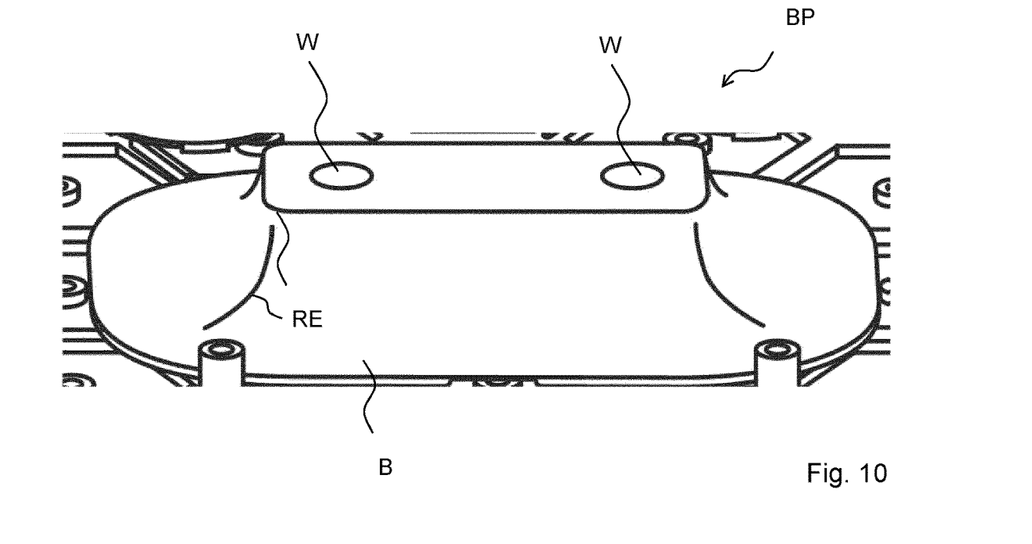
FIG. 10 shows a bottom part of a load transferring element having a rectangular cross-section of variable size with rounded edges.
Figure 11:
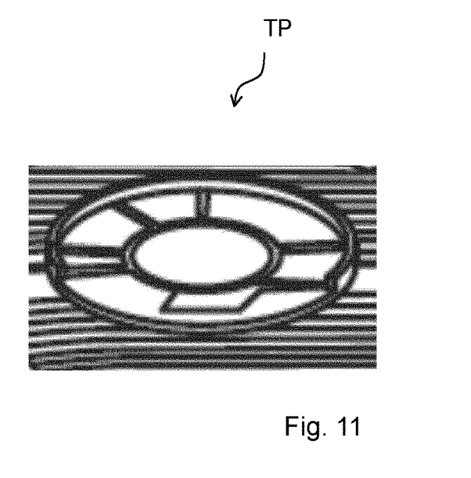
FIG. 11 shows a top part of a load transferring element in a perspective view.

FIG. 10 illustrates a more massive bottom part BP of a load transferring element that has a substantially rectangular cross-section. The cross-section is reduced in the perspective from the bottom side to the top side along the z-axis. The rectangular cross-section has rounded edges RE that help to accommodate the wiring of a corresponding coil. The bottom part BP shown in FIG. 10 can be used in the centre of a primary coil of a WPT system. The bottom part BP has two cut-outs in the shape of wells W to accommodate corresponding pins of a top part of the load transferring element (not shown).

Figure 12:
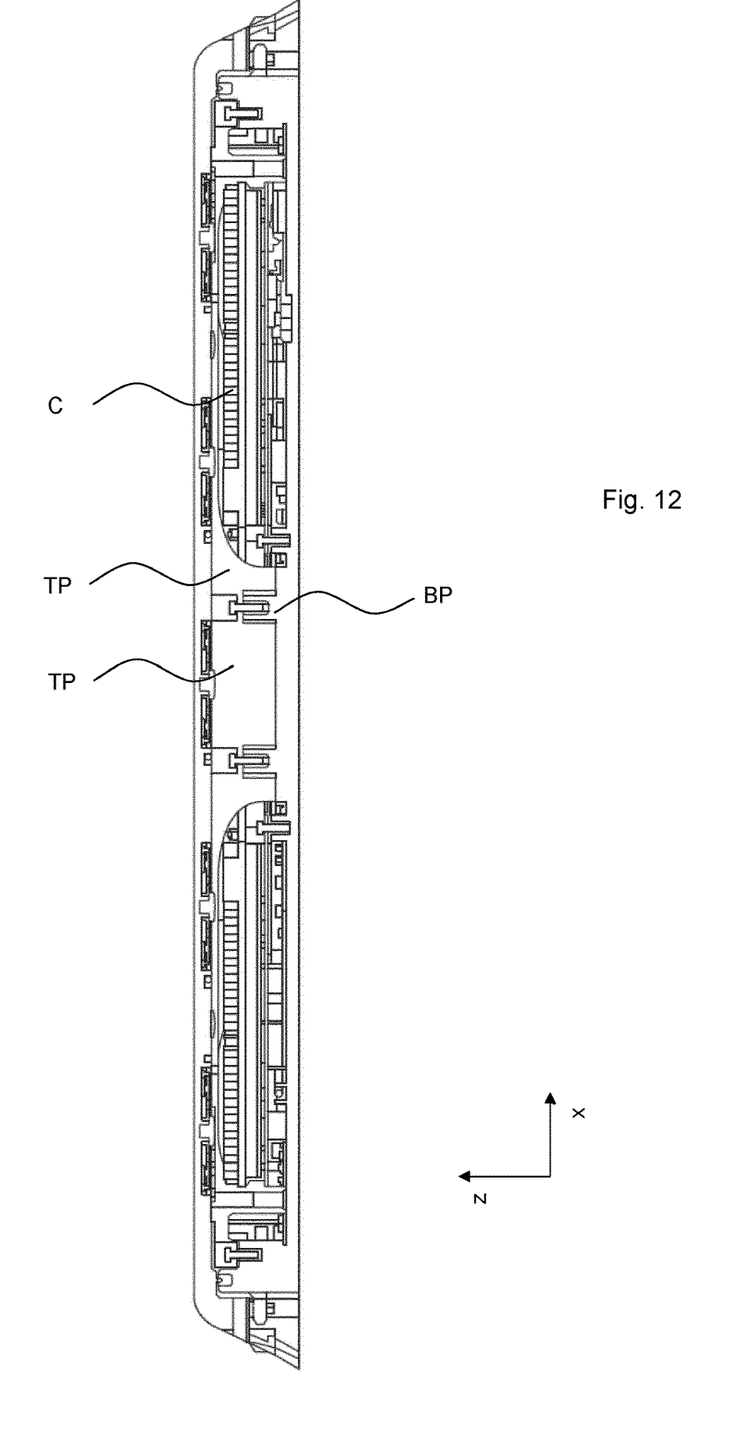
FIG. 12 shows a cross-section through a housing of a stationary part of a WPT system indicating the high package density allowable with corresponding load transferring elements.

FIG. 12 illustrates a cross-section through the stationary part of a WPT system. The stationary part can have two coils C that are electrically connected in a DD ("Double D") configuration.

Top parts TP and bottom parts BP of load transferring elements protect sensitive structures of the stationary part of the WPT system from detrimental forces in the vertical direction z.

The stationary part of the WPT system essentially extends in the xy plane.

Figure 13:
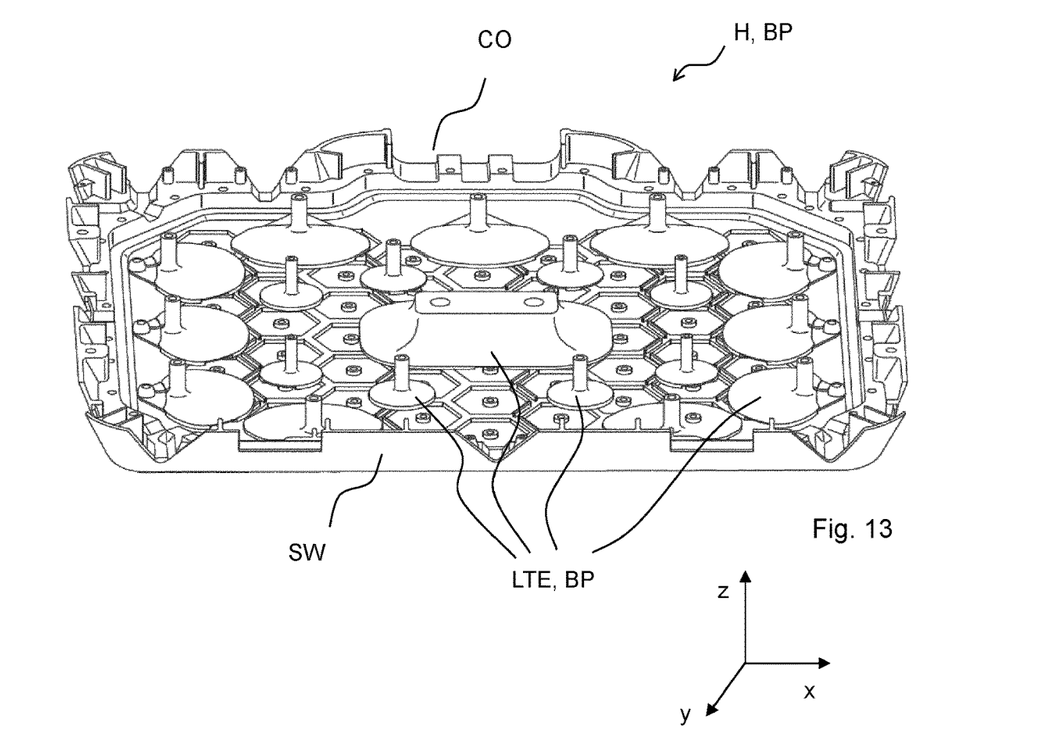
FIG. 13 shows a bottom part of a housing of a stationary part of a WPT system comprising a plurality of bottom parts of load transferring elements in a perspective view.

FIG. 13 shows a bottom part BP of the housing H of a stationary part of a WPT system in a perspective view. A plurality of bottom parts BP of load transferring elements LTE is distributed over the bottom side of the bottom part BP of the housing H. The load transferring elements have cross-sections at their connections that are substantially smaller than the cross-sections at the bottom part of the load transferring elements (and substantially smaller than the cross-sections at the top parts, compare FIG. 14). Thus, a lot of volume is available for accommodating coils, circuitry and other sensitive circuit components such as switches and antennas for communicating with a secondary part of the WPT system. A sidewall SW has a plurality of cut-outs CO such that a corresponding top part of the housing can be attached to the bottom part BP in a pin/well configuration or for signal or power cables entering or leaving the housing H.

Figure 14:
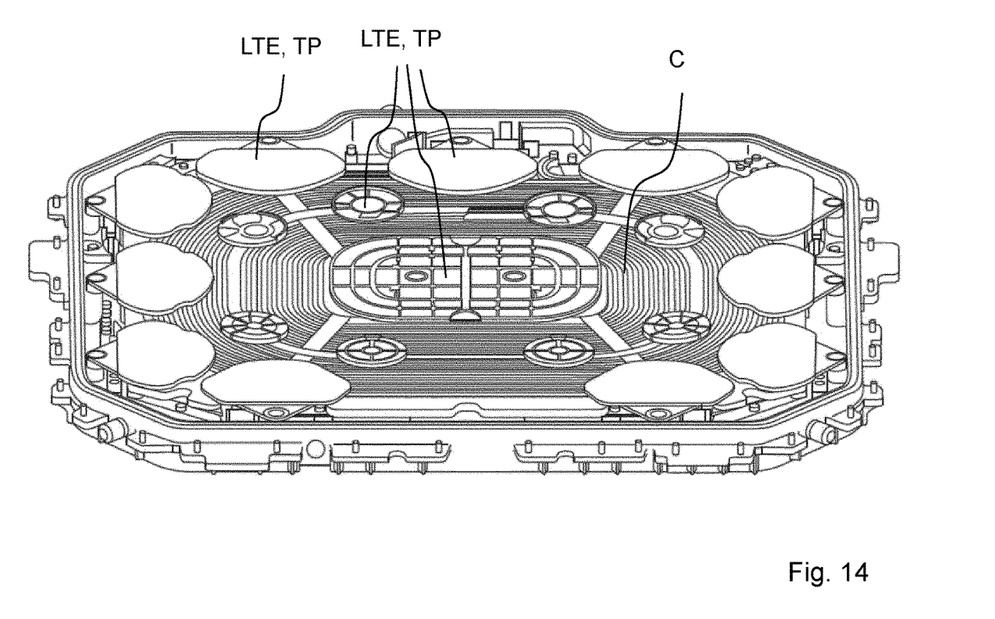
FIG. 14 shows a bottom part of a housing of a stationary part of a WPT system with installed coils and top parts of load transferring elements in a perspective view.

FIG. 14 illustrates a further intermediate state when assembling the housing H. In addition to the elements shown in FIG. 13, the housing also accommodates a coil C and top parts TP of the load transferring elements LTE corresponding to the bottom parts shown in FIG. 13.

The load transferring element and the housing are not limited by the details described above or shown in the schematic figures. Load transferring elements comprising additional structural elements and housings comprising additional load transferring elements or circuit components are also possible.

Although the invention has been illustrated and described in detail by means of the preferred embodiment examples, the present invention is not restricted by the disclosed examples and other variations may be derived by the skilled person without exceeding the scope of protection of the invention.

The invention claimed is:

1. A load transfer element comprising:
   a bottom side, a top side and a connection between the bottom side and the top side,
   wherein the load transfer element is arranged to contact a top side and a bottom side of a housing of a stationary part of a wireless power transfer (WPT) system in order to transfer a mechanical load from the top side of the housing to the bottom side of the housing, the WPT system accommodating a wireless power transmitter,
   wherein the load transfer element is a pillar consisting of a single part,
   wherein the load transfer element has a vertical position where a cross-section reaches a minimal value,
   wherein, from the bottom side of the load transfer element to the vertical position of minimal cross-section, the cross-section continuously decreases and, from the vertical position of the minimal cross-section to the top side of the load transfer element, the cross-section continuously increases; and
   wherein a bottom face of the top side of the load transfer element or a top face of the bottom side of the load transfer element comprises a cut-out configured to host at least partially one or more of a sensor and a coil.

2. The load transfer element of claim 1, wherein the load transfer element comprises a material having a magnetic susceptibility x.

3. The load transfer element of claim 1, wherein the load transfer element comprises a material selected from the group consisting of polyamide, polyamide 66, a composite material, fiberglass, a carbon fiber reinforced polymer and a thermoplastic.

4. The load transfer element of claim 1, wherein the cut-out is configured to host at least partially the sensor.

5. The load transfer element of claim 1, wherein the mechanical load is 30 kN.

6. The load transfer element of claim 1, wherein the load transfer element has a length l, a width w and a height h with 5 cm≤l≤30 cm, 5 cm≤w≤30 cm and 5 cm≤h≤15 cm.

7. A stationary part for a WPT system, the stationary part comprising:
   a housing comprising:
      a bottom side of the housing; and
      a top side of the housing;
   a primary coil; and
   one or more load transfer elements,
   wherein the one or more load transfer elements comprise a bottom side, a top side and a connection between the bottom side and the top side,
   wherein the one or more load transfer elements are configured to transfer a mechanical load from the top side of the housing to the bottom side of the housing,
   wherein each of the one or more load transfer elements is a pillar consisting of a single part,
   wherein each of the one or more load transfer elements has a vertical position where a cross-section reaches a minimal value,
   wherein, from the bottom side of each load transfer element to the vertical position of minimal cross-section, the cross-section continuously decreases and, from the vertical position of the minimal cross-section to the top side of each load transfer element, the cross-section continuously increases; and
   wherein a bottom face of the top side of each load transfer element or a top face of the bottom side of each load transfer element comprises a cut-out configured to host at least partially one or more of a sensor and the primary coil.

8. The stationary part of claim 7, further comprising one or a plurality of sensors including the sensor.

9. The stationary part of claim 8, further comprising one or a plurality of magnetic field guiding structures.

10. The stationary part of claim 8, wherein the top side of the housing is a structured top side.

11. The stationary part of claim 8, wherein the housing comprises a plastic material.

12. The stationary part of claim 7, wherein the one or more load transfer elements comprise a material having a magnetic susceptibility x.

13. The stationary part of claim 7, wherein the one or more load transfer elements comprise a material selected from the group consisting of polyamide, polyamide 66, a composite material, fiberglass, a carbon fiber reinforced polymer and a thermoplastic.

14. The stationary part of claim 7, wherein the cut-out is configured to host at least partially the sensor.

15. The stationary part of claim 7, wherein the cut-out is configured to host at least partially the primary coil.

16. The stationary part of claim 7, wherein the mechanical load is 30 kN.

17. The stationary part of claim 7, wherein the one or more load transfer elements have a length l, a width w and a height h with 5 cm≤l≤30 cm, 5 cm≤w≤30 cm and 5 cm≤h≤15 cm.

18. A load transfer element comprising:
 a bottom side, a top side and a connection between the bottom side and the top side,
 wherein the load transfer element is arranged to contact a top side and a bottom side of a housing of a stationary part of a wireless power transfer (WPT) system in order to transfer a mechanical load from the top side of the housing to the bottom side of the housing, the WPT system accommodating a wireless power transmitter,
 wherein the load transfer element is a pillar consisting of a plurality of parts,
 wherein the load transfer element has a vertical position where a cross-section reaches a minimal value,
 wherein, from the bottom side of the load transfer element to the vertical position of minimal cross-section, the cross-section continuously decreases and, from the vertical position of the minimal cross-section to the top side of the load transfer element, the cross-section continuously increases; and
 wherein a bottom face of the top side of the load transfer element or a top face of the bottom side of the load transfer element comprises a cut-out configured to host at least partially one or more of a sensor and a coil.

19. The load transfer element of claim 18, wherein the bottom side and the top side of the load transfer element are mechanically connected in a pin/well configuration or in a pin/tube configuration.

* * * * *

UNITED STATES PATENT AND TRADEMARK OFFICE
CERTIFICATE OF CORRECTION

PATENT NO. : 11,955,804 B2  
APPLICATION NO. : 17/428064  
DATED : April 9, 2024  
INVENTOR(S) : Hirschi et al.

Page 1 of 1

It is certified that error appears in the above-identified patent and that said Letters Patent is hereby corrected as shown below:

In the Claims

In Column 8, in Claim 2, Line 10, after "susceptibility" delete "x." and insert -- $\chi$. --.

In Column 8, in Claim 12, Line 62, after "susceptibility" delete "x." and insert -- $\chi$. --.

Signed and Sealed this  
Fourteenth Day of May, 2024

Katherine Kelly Vidal  
*Director of the United States Patent and Trademark Office*